US007787971B2

(12) United States Patent
Hall

(10) Patent No.: US 7,787,971 B2
(45) Date of Patent: Aug. 31, 2010

(54) ROTOR SELECTION INTERFACE AND METHOD

(75) Inventor: Richard A. Hall, Southbury, CT (US)

(73) Assignee: Thermo Fisher Scientific (Asheville) LLC, Asheville, NC (US)

( * ) Notice: Subject to any disclaimer, the term of this patent is extended or adjusted under 35 U.S.C. 154(b) by 1365 days.

(21) Appl. No.: 10/724,623

(22) Filed: Dec. 2, 2003

(65) Prior Publication Data

US 2005/0120142 A1 Jun. 2, 2005

(51) Int. Cl.
*G05B 11/01* (2006.01)
*G05B 15/00* (2006.01)
*G06F 3/00* (2006.01)
*G06F 3/048* (2006.01)

(52) U.S. Cl. .......................... 700/83; 700/17; 715/745; 715/804; 715/811; 715/825

(58) Field of Classification Search .................. 700/17, 700/83; 710/1; 715/745, 804, 811, 825
See application file for complete search history.

(56) References Cited

U.S. PATENT DOCUMENTS 3,582,699 A * 6/1971 Badessa et al. ............. 388/809
5,287,265 A * 2/1994 Hall et al. ..................... 700/83
5,358,343 A * 10/1994 Klauber ...................... 400/485
5,625,783 A * 4/1997 Ezekiel et al. .............. 719/320
5,865,718 A * 2/1999 Chan ........................... 494/10
5,926,387 A * 7/1999 Furst ........................... 700/83
6,393,429 B1 * 5/2002 Yagi et al. ................... 707/102
6,589,152 B2 * 7/2003 Akatsu et al. ................. 494/10
6,679,821 B1 * 1/2004 Numata et al. ................ 494/10
6,879,262 B1 * 4/2005 Todteberg et al. ........... 340/679
6,901,559 B1 * 5/2005 Blum et al. ................. 715/811
7,343,208 B2 * 3/2008 Hoefler et al. ................ 700/83
7,396,324 B2 * 7/2008 Tetsu et al. .................... 494/7
7,418,670 B2 * 8/2008 Goldsmith .................. 715/810
2002/0186238 A1 * 12/2002 Sylor et al. ................. 345/736
2003/0115176 A1 * 6/2003 Bobroff et al. ................. 707/1
2003/0199379 A1 * 10/2003 Schneider et al. ............. 494/11
2005/0240874 A1 * 10/2005 Kiesekamp et al. ......... 715/745

* cited by examiner

*Primary Examiner*—Albert DeCady
*Assistant Examiner*—Jennifer L Norton
(74) *Attorney, Agent, or Firm*—Wood, Herron & Evans, LLP

(57) ABSTRACT

In a user interface to select a desired rotor from a set of rotors corresponding to compatible rotors for use in a centrifuge device, a home menu is utilized to access a previously selected rotor and an add menu is utilized to add the desired rotor in response to the desired rotor being absent from the home menu. In addition, the add menu includes the set of rotors.

36 Claims, 7 Drawing Sheets

ROTOR SELECTION INTERFACE AND METHOD

FIELD OF THE INVENTION

The present invention generally relates to a selection interface device and method. More particularly, the present invention pertains to an interface device and method for selecting a centrifuge rotor from a plurality of rotors.

BACKGROUND OF THE INVENTION

Centrifuges are typically designed to run a population of rotors. In this regard, a given centrifuge system may include upwards of 30 or more compatible rotors. It is important to know which rotor is being used as performance parameters are impacted by rotor characteristics. For example, the performance parameters of Relative Centrifugal Force (RCF) mode are calculated based on the location of the sample in the rotor. Therefore, rotor identification and tracking devices have been incorporated into some conventional centrifuges. For example, some conventional centrifuges include a display to present a list of compatible rotors to a user and toggle switches to provide the user with a scrolling and/or rotor selection means. However, the large number of compatible rotors can make this a laborious and difficult process. To facilitate the selection, some centrifuges have the rotors grouped in sub-populations by type (for example, fixed angle, swinging bucket, vertical). While this may be an improvement, there are still large numbers of rotors in a sub-population (for example, 20 or more fixed angle rotors) making the selection process difficult.

Another conventional method of reducing the possible rotor selections to scroll through relies upon a "recently used list." This recently used list typically includes the 3 to 5 most recently used rotors. However, this method is of little or no value when selecting rotors not included in the recently used list. For example, if the desired rotor has not been previously used or the number of rotors used exceeds the capacity of the recently used list.

Accordingly, it is desirable to provide a method and apparatus capable of overcoming the disadvantages described herein.

SUMMARY OF THE INVENTION

The foregoing needs are met, to a great extent, by the present invention, wherein in one respect an apparatus and method is provided that in some embodiments improves the process of selecting a rotor for use in a centrifuge device.

An aspect of the present invention pertains to a user interface to select a desired rotor from a set of rotors corresponding to compatible rotors for use in a centrifuge device. The user interface includes a home menu to access a previously selected rotor and an add menu to add the desired rotor in response to the desired rotor being absent from the home menu. In addition, the add menu includes the set of rotors.

Another aspect of the present invention relates to an apparatus to select a desired rotor from a set of rotors compatible for use in a centrifuge device. The apparatus includes a display, a key, a memory and a processor. The display is used to present a home menu and an add menu. The home menu includes a plurality of home menu options. These home menu options include a previously selected rotor and an add function. The add menu includes a plurality of add menu options. This plurality of add menu option includes the set of rotors. The key is used to navigate the home menu and the add menu. This key is configured to generate a signal in response to being engaged. The memory is used to store a run parameter. The processor is used to control the display and receive the signals from the key. This processor is configured to control the display to initially present the home menu, store the previously selected rotor to the run parameter in response to a selection event while the previously selected rotor is being displayed, control the display to present the add menu in response to the add function being selected, and move a newly selected rotor of the set of rotors to the home menu from the add menu and store the newly selected rotor to the run parameter in response to the selection event while the newly selected rotor is being displayed.

Yet another aspect of the present invention pertains to an apparatus for providing a user interface for the user to select a desired rotor from a set of rotors compatible for use in a centrifuge device. The apparatus includes a means for displaying a home menu option of a plurality of home menu options in a home menu. This home menu options includes a previously selected rotor and an add function. In addition, the apparatus includes a means for storing the previously selected rotor to a run parameter in response to a selection event while the previously selected rotor is being displayed and a means for displaying an add menu option of a plurality of add menu options in an add menu in response to a selection event while the add function is being displayed. The apparatus further includes a means for moving a newly selected rotor of the set of rotors to the home menu from the add menu and means for storing the newly selected rotor to the run parameter in response to the selection event while the newly selected rotor is being displayed.

Yet another aspect of the present invention relates to an apparatus for selecting an option from a set of options. The apparatus includes a means for providing a first subset of options from which to select the option. The first subset of options is configured to include at least one option of the set of options. The apparatus further includes a means for interfacing configured to provide a means for scrolling through the first subset of options and a means for selecting the option and a means for providing a second subset of options configured to include a remainder of option corresponding to the set of options minus the first subset of option. The interfacing means is further configured to provide a capability of scrolling through the second subset of options and moving a selection from the second subset of options to the first subset of options.

Yet another aspect of the present invention pertains to a method of providing a user interface to a user for the user to select a desired rotor from a set of rotors compatible for use in a centrifuge device. In this method, a home menu option of a plurality of home menu options in a home menu is displayed. The home menu options include any previously selected rotor and an add function. Additionally, the previously selected rotor is stored to a run parameter in response to a selection event while the previously selected rotor is being displayed and an add menu option of a plurality of add menu options in an add menu is displayed in response to a selection event while the add function is being displayed. Furthermore, a newly selected rotor of the set of rotors is moved to the home menu from the add menu and the newly selected rotor is stored to the run parameter in response to the selection event while the newly selected rotor is being displayed.

Yet another aspect of the present invention relates to a method of selecting an option from a set of options. In this method, a first subset of options is provided from which to select the option. This first subset of options is configured to include at least one option of the set of options. Additionally, an interface configured to provide a capability of scrolling through the first subset of options and selecting the option is provided and a second subset of options configured to include a remainder of option corresponding to the set of options minus the first subset of option is provided. The interface is further configured to provide a capability of scrolling through the second subset of options and moving an option from the second subset of options to the first subset of options.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides a user interface device for a centrifuge and a method of selecting a rotor for use in the centrifuge. In some embodiments, the user interface device includes a plurality of switches for selecting a particular rotor from a list of compatible rotors and at least one display to display these rotors. The type or types of switches utilized includes any suitable device. Specific examples of suitable switches include: mechanical and solid state toggles; mechanical and solid state buttons; computer programmed icons or virtual toggles and/or switches; rotary dial; and/or the like. In this regard, the switches may be incorporated into the display such as, for example, a touch screen. The display includes any suitable display device. Specific examples of suitable displays include: liquid crystal displays (LCD); cathode ray tube (CRT); thin film transistor (TFT); color super-twist nematic (CSTN); high performance addressing (HPA); organic light emitting diode (OLED); digital light processing (DLP); touch screens; and the like.

Another embodiment in accordance with the present invention provides a method of selecting a desired rotor for use in a centrifuge. This desired rotor is selected from a set of compatible rotors. In this method, a first subset of compatible rotors is provided from which to select the desired rotor. This first subset of compatible rotors is provided in the form of a scrollable list. The user interface, as described herein, is provided to scroll through this first list and select the desired rotor. A second subset of compatible rotors is also provided. This second subset of compatible rotors is also provided in the form of a list. This second list includes a remainder of compatible rotors corresponding to the set of compatible rotors minus the first subset of compatible rotors. Should the desired rotor not be found in the first list, the desired rotor is transferred from the second list to the first list. The user interface is further provided to scroll through the second list and move the desired rotor from the second list to the first list. In this manner, the first list is maintained to include substantially all desired rotors.

In the following detailed description of the figures, a circular type list is presented for selecting the desired rotor. That is, when scrolling past the relatively last rotor in the list, the display returns to the relatively first rotor. Similarly, when scrolling past the relatively first rotor in the list, the display returns to the relatively last rotor. However, this should not be construed as a limitation, but rather, any suitable type of list such as, for example, a linear type list, is within the scope of various embodiments of the invention.

Figure 1:
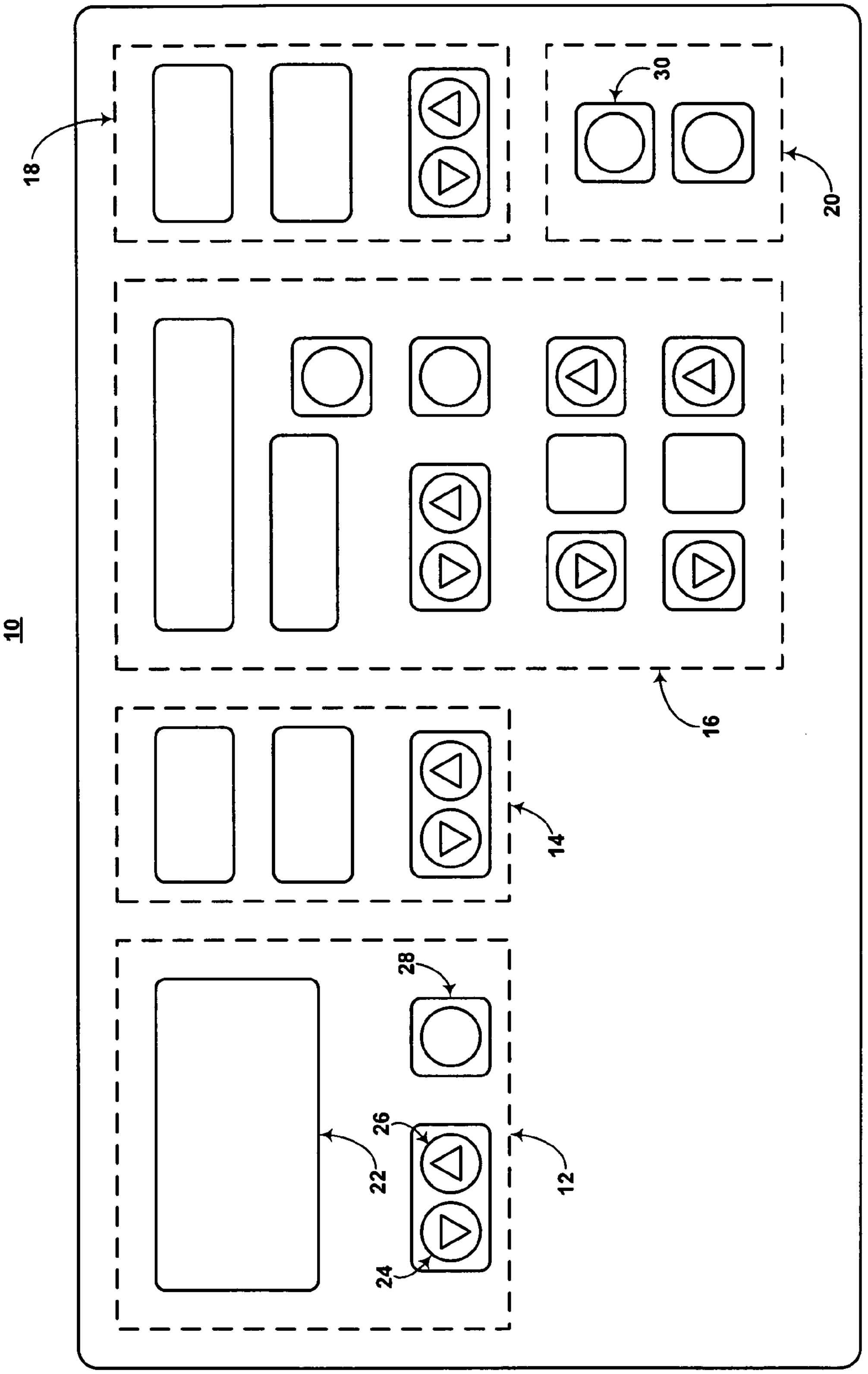
FIG. 1 is an illustration of a user interface for a centrifuge according to an embodiment of the invention.

Referring now to the figures, in FIG. 1 there is shown a user interface 10 in accordance with an embodiment of the invention. As shown in FIG. 1, the user interface 10 includes a rotor identification area 12, a run time area 14, a speed area 16, a temperature area 18, and a start/stop area 20. The rotor identification area 12 includes a rotor identification display 22, a down key 24, an up key 26, and select key 28. The various keys of the user interface 10 may include any suitable actual and/or virtual device capable of being manipulated by the user. Suitable key and/or key-like devices include: push buttons, rotary dial, blister buttons, rocker switches, computer icons, and the like. These keys may be engaged or activated by the user in any suitable manner such as, for example pressing, touching, clicking via a computer mouse, and the like.

The down key 24 is for scrolling down or in a clockwise manner through options of a menu. The up key 26 is for scrolling up or in a counter-clockwise manner through options of the menu. In operation, one or a few menu items are displayed on the display 22 and these menu items are altered by engaging the down and/or up keys 24 and 26. For example, an option from the menu may be displayed on the display 22 and by engaging the down key 24, a next option is displayed on the display 22. In another example, a few options of the menu may be displayed with one option being highlighted. By engaging the down or up keys 24 and 26, the menu is caused to scroll down or up with the highlighting changing accordingly. Once the desired option is displayed and/or highlighted on the display 22, this option is selected by engaging the select key 28. In this manner, the desired option may be actively selected. Alternatively, the desired option may be passively selected. That is, once the desired option is displayed and/or highlighted, this option is selected by default when a start key 30 is engaged in the start/stop area 20.

Other parameters are selected in their respective areas and the run is initiated by engaging the start key 30. More specifically, a run time parameter is entered in the run time area 14, a run speed parameter in revolutions per minute (rpm) or in Relative Centrifugal Force (RCF) is entered in the speed area 16, and a run temperature parameter is entered in the temperature area 18. In addition, an acceleration rate parameter and a deceleration rate parameter may be entered in the speed area 16.

Figure 2:
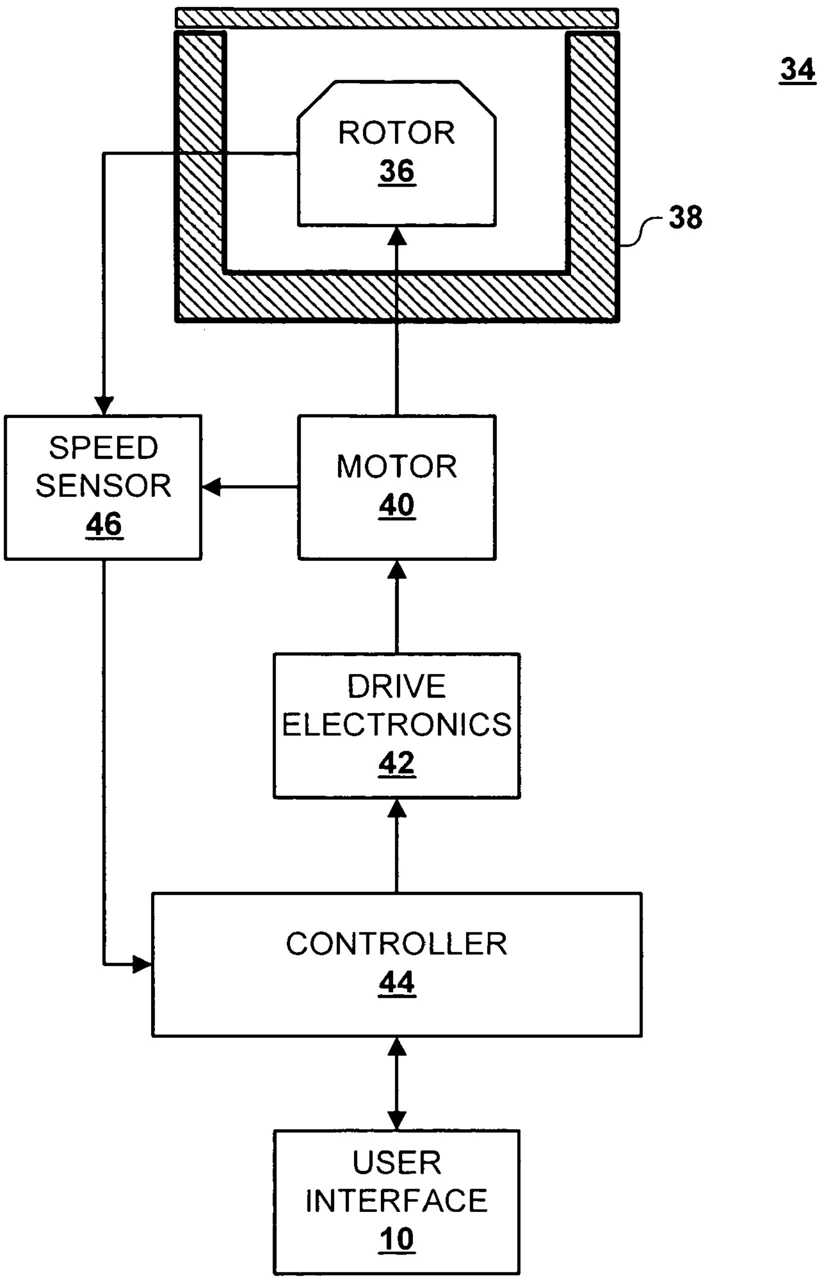
FIG. 2 is a block diagram of a centrifuge suitable for use in an embodiment of the invention.

FIG. 2 is a block diagram of a centrifuge device 34 according to an embodiment of the invention. As shown in FIG. 2, the centrifuge 34 is operable to spin a rotor 36 within a containment system 38. While the rotor 36 generally represents any rotor that is compatible with the centrifuge 34, for the purpose of this disclosure, the rotor 36 represents a particular rotor type and model number that has been placed, or is intended to be placed, in the centrifuge 34 by the user and is the rotor that is to be utilized during the centrifuge run. In addition, the rotor 36 is spun by a motor 40. This motor 40 is modulated by a drive electronics module 42 in response to instruction by a controller 44. This controller 44 generates these instructions based on run parameters received from the user interface 10 and from signals received from various sensors such as a speed sensor 46.

Figure 3:
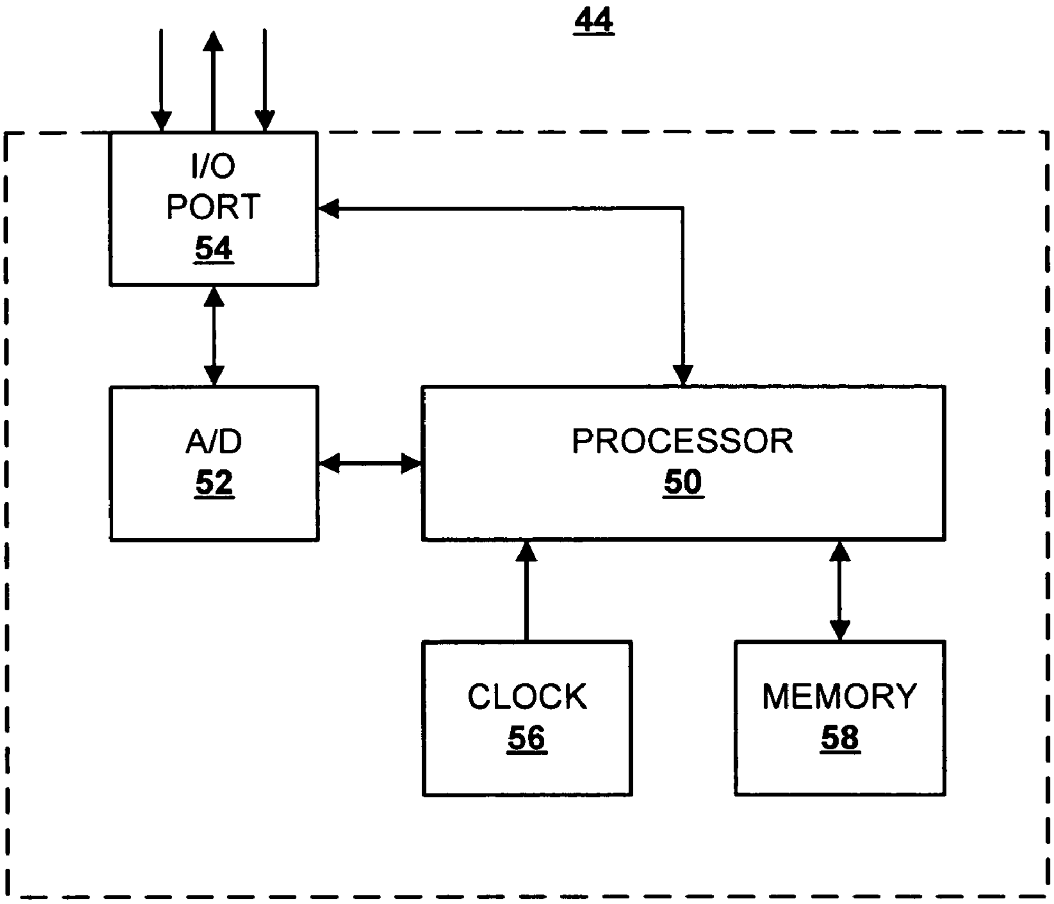
FIG. 3 is a block diagram of a system architecture for a controller of the centrifuge of FIG. 2.

FIG. 3 is a block diagram of a controller 44 for the centrifuge device 34 of FIG. 2. As shown in FIG. 3, the controller 44 includes a processor 50, an analog to digital (A/D) converter 52, an input/output (I/O) port 54, a clock 56, and a memory 58. The I/O port 54 is configured to receive signals from any suitably attached electronic device and forward these signals to the A/D converter 52 and/or the processor 50. For example, the I/O port 54 may receive signals from the user interface 10, the speed sensor 46, and the like and forward the signals to the processor 50. If the signals are in analog format, the signals may proceed via the A/D converter 52. In this regard, the A/D converter 52 is configured to receive analog format signals and convert these signals into corresponding digital format signals. Conversely, the A/D converter 52 is also configured to receive digital format signals from the processor 50, convert these signals to analog format, and forward the analog signals to the I/O port 54. In this manner, electronic devices configured to receive analog signals may intercommunicate with the processor 50.

More particularly, the processor 50 is configured to intercommunicate with the user interface 10. For example, the processor 50 is configured to: modulate the various displays of the user interface 10; accept key engagement events from the various keys such as the down, up, and select keys 24-28; and the like. In this manner, the processor 50 is configured to present options to the user and accept user input such as the run parameters.

The processor 50 is configured to receive and transmit signals to and from the A/D converter 52 and/or the I/O port 54. The processor 50 is further configured to receive time signals from the clock 56. In addition, the processor 50 is configured to store and retrieve electronic data to and from the memory 58. In this regard, the memory is configured to store, at least, run parameters, menu structures, menu options, and the like.

Figure 4:
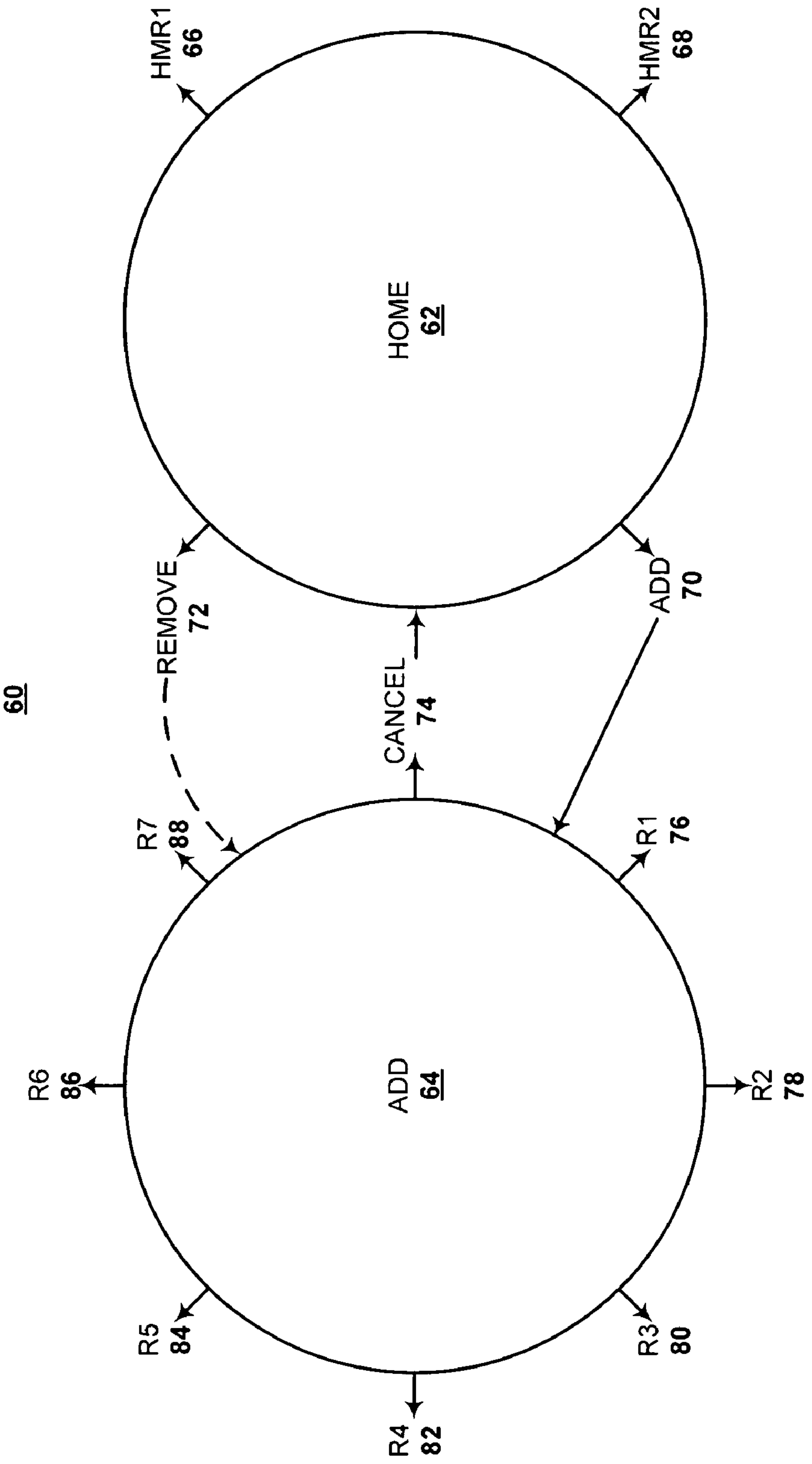
FIG. 4 is a diagram depicting a structure for a menu according to an embodiment of the invention.

FIG. 4 is an illustration depicting a menu 60 according to an embodiment of the invention. As shown in FIG. 4, the menu 60 includes a home menu 62, and an add menu 64. The home menu 62 includes rotors 66 and 68, an add function 70, and a remove option 72. In general, the rotors 66 and 68 represent rotors that have been added to the home menu 62 from the add menu 64 during the process of entering parameters of a centrifuge run. Other examples of what the rotors 66 and 68 may represent include: rotors that have been included with the purchase of centrifuge and added by sales personnel and/or; rotors purchased separately from the purchase of the centrifuge and added by the customer and/or a sales representative. While two rotors 66 and 68 are depicted, the number of rotors may vary from zero to any suitable number. For example, when purchased, the home menu 62 may include zero rotors. In another example, in a centrifuge in which every compatible rotor has been added, the home menu 62 may include essentially all compatible rotors. Thus, the two rotors 66 and 68 are for the purpose of example only.

To navigate the home menu 62, the down, up, and/or select keys 24-28 are engaged. In a specific example, if the rotor 66 is the rotor 36, the down and/or up keys 24 and 26 are engaged until the rotor 66 is displayed and/or highlighted on the display 22. If the rotor 36 is not listed in the home menu, the add function 70 is utilized to display the add menu 64. When the add function 70 is selected, the add menu 64 is available for navigation by the down, up, and/or select keys 24-28 and options within the add menu 64 are available for selection. Selecting an option from the add menu 64 results in the movement of the selected option from the add menu 64 to the home menu 62. In various embodiments of the invention, this movement may be constructive or destructive. That is, in constructive movement, a copy of the selected item is generated and added to the home menu 62. Alternatively, in destructive movement, the selected option is deleted from the add menu 64 and added to the home menu 62.

Examples of selectable options in the add menu 64 include a cancel option 74 and a plurality of rotors 76 to 88. The cancel option 74 is selected to exit the add menu 64 and return to the home menu 62 without making a rotor selection. As described herein, the rotors 76 to 88 are available for selection and movement to the home menu 62. While the FIG. 4 includes seven rotors 76 to 88, the seven rotors are for the purpose of example only. In this regard, embodiments of the invention may include any suitable number of rotors. In general, the number of rotors corresponds to the number of compatible rotors for the particular centrifuge, and thus, a centrifuge having one, five, a hundred or more compatible rotors may have a like number of rotors.

Figure 5:
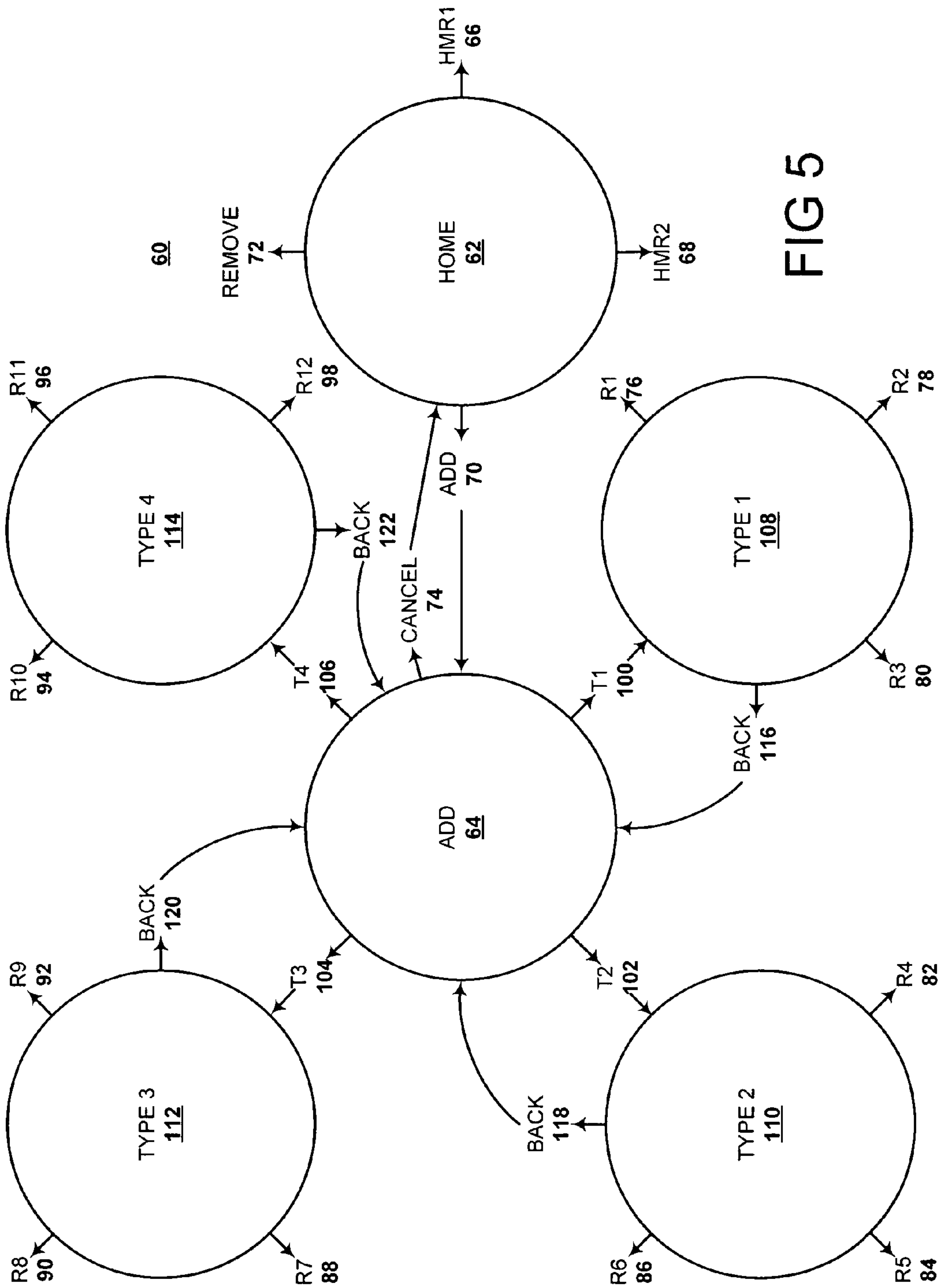
FIG. 5 is a diagram depicting a structure for a menu according to another embodiment of the invention.

FIG. 5 is an illustration depicting a menu 60 according to another embodiment of the invention. The menu 60 shown in FIG. 5 is similar to the menu 60 shown in FIG. 4 and thus, for the purpose of brevity, those items described in FIG. 4 will not be described again in FIG. 5. In addition to the rotors 76 to 88, the menu 60 further includes a plurality of rotors 90 to 98. To access the rotors 76 to 98, the add menu 64 includes a plurality of type options 100 to 106. Each of the type options 100 to 106 facilitate access to a respective rotor type. Examples of rotor types include: fixed angle; swinging bucket; vertical; and the like. Additionally, rotor types may be differentiated based on sample volume capacity, material utilized to construct the rotor, maximum rotational velocity rating of the rotor, maximum number of samples, and the like. These rotor types are segregated into a plurality of type menus 108 to 114. Thus, to access the rotors 76 to 80 disposed within the type menu 108, the type option 100 is selected from the add menu 64. It is therefore an advantage of various embodiments of the invention that the rotors are quickly and efficiently narrowed by selecting a rotor type. In addition, while four type menus 108 to 114 are depicted, the various embodiments of the invention are not limited to four type menus, but rather, any suitable number of type menus are within the scope of the invention.

The menu 60 further includes a plurality of back options 116 to 122. As shown in FIG. 5, each of the type menus 108 to 114 includes a respective one of the back options 116 to

122. Each back option 116 to 122 facilitates leaving the respective type menu 108 to 114 and returning to the add menu 64 without selecting a rotor.

Figure 6:
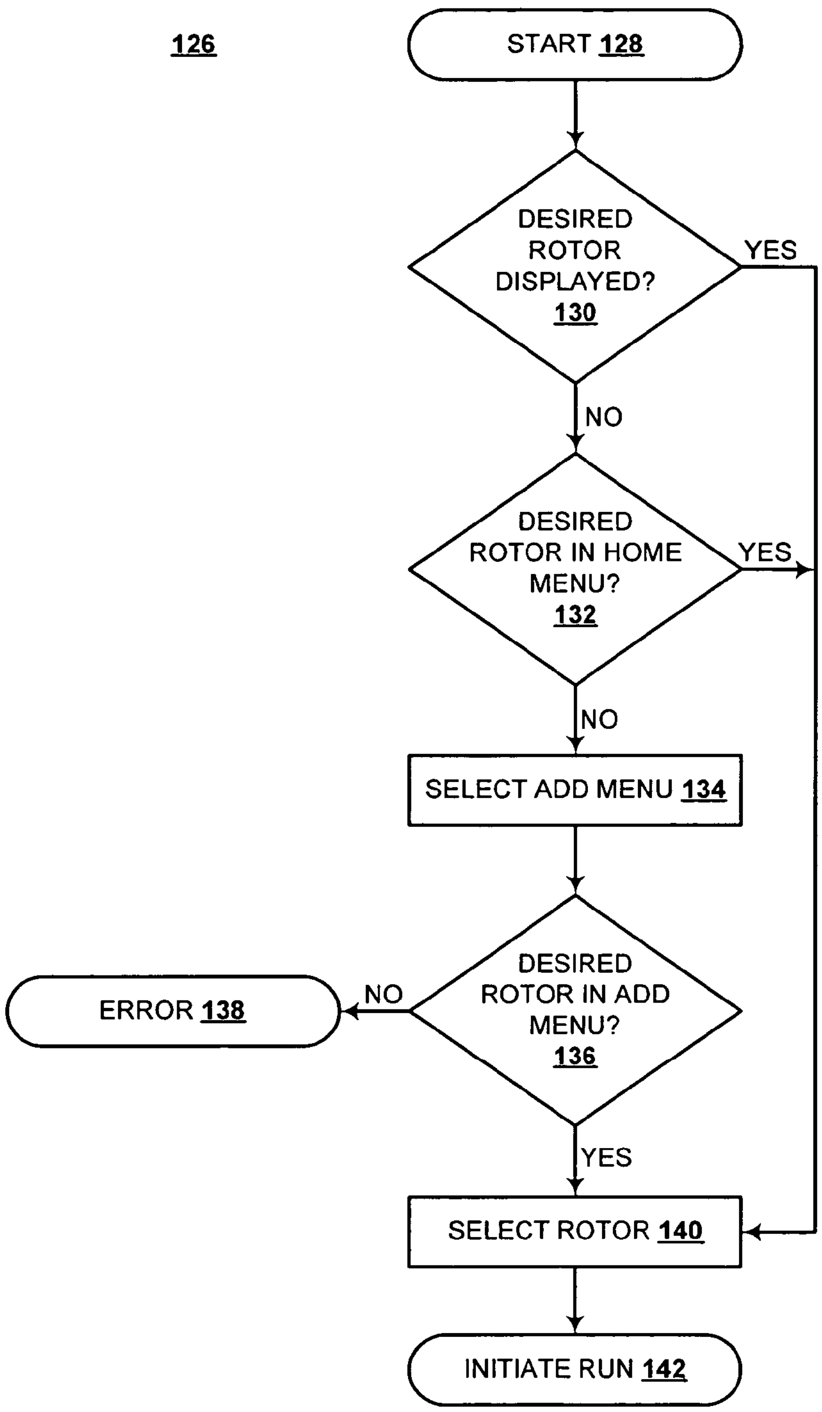
FIG. 6 is a flow diagram illustrating steps that may be followed in accordance with an embodiment of the method or process.

FIG. 6 is a flow diagram of a method 126 for navigating the menu 60 according to an embodiment of the invention. Prior to initiation of the method 126, the centrifuge 34 is turned on. In addition a variety of other operations may occur prior to initiation of the method at step 128. These operations include one or more of the following, in no particular order: load the rotor 36; close the containment system 38; obtain proper atmospheric pressure in centrifuge chamber; set run parameters; and the like. As shown in FIG. 6, the method 126 is initiated at step 128 in order to enter a rotor parameter of a centrifuge run. This rotor parameter is typically based upon the rotor type and model number that is to be utilized in the centrifuge run. In the following description, the rotor 36 represents a match for the rotor type and model of the rotor utilized in the centrifuge run.

At step 130 it is determined whether the rotor 36 is displayed on the display 22. For example, if the rotor type and model number coincide with the rotor type and model number of the rotor 36, then it is determined that the rotor 36 is displayed. If it is determined that the rotor 36 is displayed and/or highlighted on the display 22, then the rotor 36 is selected at step 140. If, at step 130, it is determined that the rotor 36 is not displayed, then the rotor 36 is searched for in the home menu 62 at step 132.

At step 132 it is determined whether the rotor 36 is contained within the home menu 62. For example, the down and/or up keys 24 and 26 are engaged to scroll through the home menu 62 and display and/or highlight the various options of the home menu 62. In this manner, the menu 60 facilitates a search by the user for the rotor 36. If it is determined that the rotor 36 is contained within the home menu 62, then the rotor 36 is selected at step 140. For example, if at step 132, while scrolling through the home menu 62, the rotor 36 is displayed and/or highlighted in the display 22, then the rotor 36 is selected at step 140. If it is determined that the rotor 36 is not contained within the home menu 62, then, at step 134, the menu 60 is navigated to access the add menu 64. Alternatively, access to the add menu 64 may automatically proceed following navigation of the home menu 62.

At step 134 the menu 60 is navigated to access the add menu 64. For example, the down and/or up keys 24 and 26 are engaged to scroll through the home menu 62 and display and/or highlight the various options of the home menu 62 until the add function 70 is displayed and/or highlighted. The add function 70 is selected in any suitable manner. Suitable selection manners include, but not limited to: engaging the select key 28; engaging both the down and up keys 24 and 26 at essentially the same time; waiting a predetermined time; and the like. In response to selection of the add function 70, the display 22 is re-configured to display the various options of the add menu 64. Following the selection of the add function 70 at step 134, the add menu 64 is navigated to search for the rotor 36 at step 136.

At step 136 it is determined whether the rotor 36 is contained within the add menu 64. In various embodiments of the invention the rotor 36 is contained directly within the add menu 64 and/or accessed through sub-menus via selectable options within the add menu 64. An embodiment in which the rotor 36 is contained directly within the add menu 64 is illustrated in FIG. 4. In this embodiment, the down and/or up keys 24 and 26 are engaged to scroll through the add menu 64 and display and/or highlight the various options of the add menu 64 until the rotor 36 is displayed and/or highlighted. If it is determined that the rotor 36 is contained within the add menu 64, then the rotor 36 is selected at step 140. If it is determined that the rotor 36 is not contained within the add menu 64, then, at step 138, it may be determined that an error has occurred.

At step 138 it is determined that an error has apparently occurred. In general, the error pertains to an inability to find the rotor 36 within the menu 60. Potential causes for this error include: use or attempted use of an inappropriate rotor; oversight by the user of the rotor 36 within the menu 60; outdated menu 60 which does not include rotor 36; misreading of rotor identifier; and the like. If it is confirmed that the rotor 36 is appropriate for the centrifuge 34 and that the rotor type and/or model number are not contained within the menu 60, the menu 60 may be updated to include the rotor 36. This update may be performed by the user, service personnel, or the like. For example, the service personnel establishes a data link with the processor 50 and/or the memory 58 within the centrifuge 34 and data associated with the rotor 36 is written to the processor 50 and/or memory 58. In various other embodiments, data may be entered by the user or service personnel, or the memory 58 may be replaced by, for example, replacing a memory chip in the centrifuge 34.

At step 140, the rotor 36 is selected. The rotor 36 is selected in any suitable manner. Suitable selection manners include, but not limited to: engaging the select key 28; engaging both the down and up keys 24 and 26 at essentially the same time; waiting a predetermined time; initiating the centrifuge run while the rotor 36 is displayed and/or highlighted; and the like. In response to selection of the rotor 36, the rotor parameter of the centrifuge run is updated accordingly. In addition, the rotor 36 is added to the home menu 62. Following the selection of the rotor 36 at step 140, any undefined run parameters may be entered prior to initiation of the centrifuge run at step 142.

At step 142 the centrifuge run is initiated by engaging the start key 30. In response to initiation of the centrifuge run, the centrifuge 34 performs the run according to the run parameters.

Figure 7:
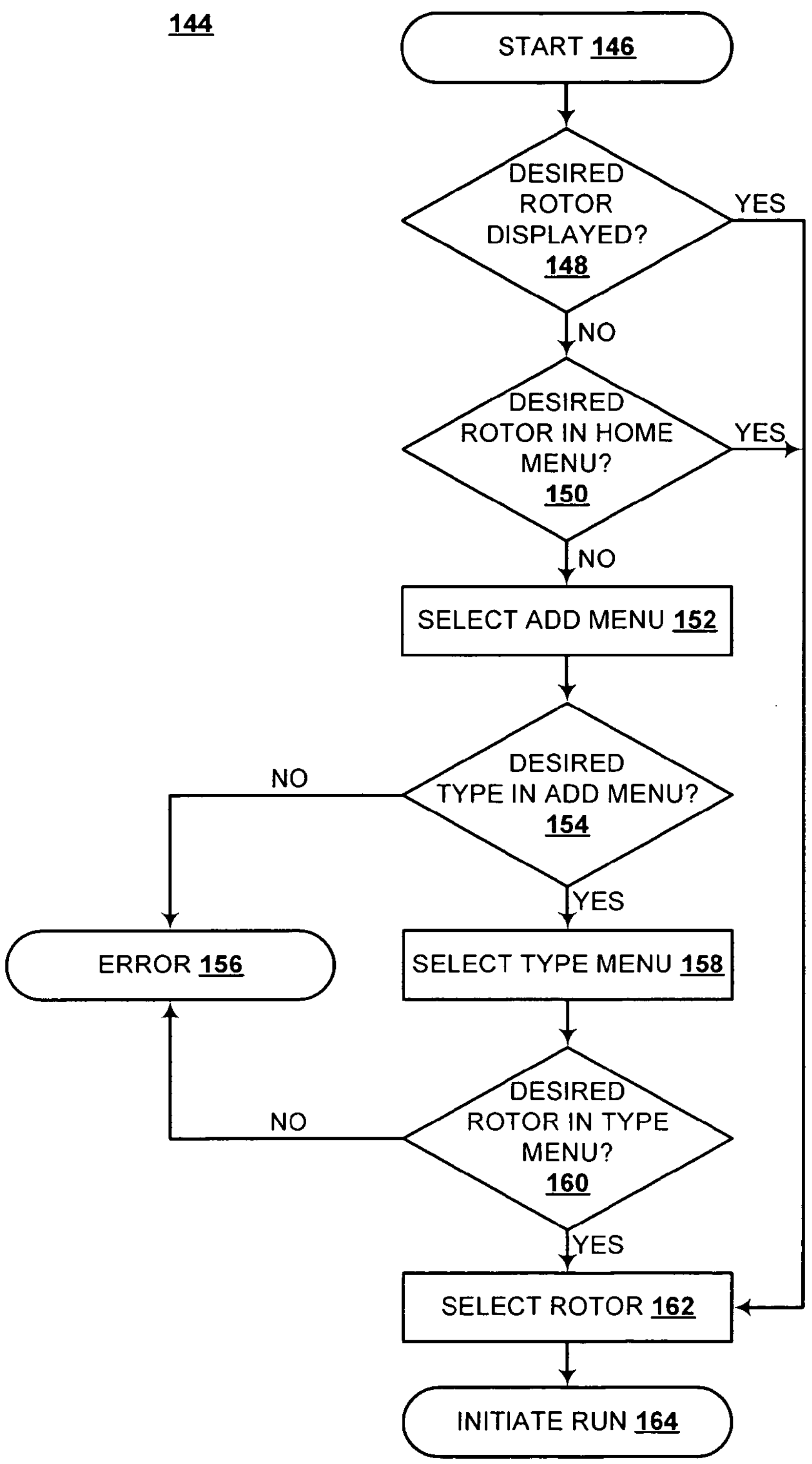
FIG. 7 is a flow diagram of a method for presenting a menu to a user according to an embodiment of the invention.

FIG. 7 is a flow diagram of a method 144 for presenting the menu 60 to the user according to another embodiment of the invention. Prior to initiation of the method 144, the centrifuge 34 is turned on. In addition a variety of other operations may occur prior to initiation of the method at step 146. These operations include one or more of the following, in no particular order: load the rotor 36; close the containment system 38; obtain proper atmospheric pressure in centrifuge chamber; set run parameters; and the like. As shown in FIG. 7, the method 144 is initiated at step 146 in order to present the menu 60 to the user and thereby facilitate entering a rotor parameter of a centrifuge run. This rotor parameter is typically based upon the rotor type and model number that is to be utilized in the centrifuge run. In the following description, the rotor 36 represents a match for the rotor type and model of the rotor utilized in the centrifuge run.

At step 148 it is determined whether the rotor 36 is displayed on the display 22. For example, if the rotor type and model number coincide with the rotor type and model number of the rotor 36, then it is determined that the rotor 36 is displayed. If it is determined that the rotor 36 is displayed and/or highlighted on the display 22, then the rotor 36 is selected at step 162. If, at step 148, it is determined that the rotor 36 is not displayed, then the rotor 36 is searched for in the home menu 62 at step 150.

At step 150 it is determined whether the rotor 36 is contained within the home menu 62. For example, the down and/or up keys 24 and 26 are engaged to scroll through the home menu 62 and display and/or highlight the various options of the home menu 62. In this manner, the menu 60 facilitates a search by the user for the rotor 36. If it is determined that the rotor 36 is contained within the home menu 62, then the rotor 36 is selected at step 162. For example, if at step 150, while scrolling through the home menu 62, the rotor 36 is displayed and/or highlighted in the display 22, then the rotor 36 is selected at step 162. If it is determined that the rotor 36 is not contained within the home menu 62, then, at step 152, the menu 60 is navigated to access the add menu 64. Alternatively, access to the add menu 64 may automatically proceed following navigation of the home menu 62.

At step 152 the menu 60 is navigated to access the add menu 64. For example, the down and/or up keys 24 and 26 are engaged to scroll through the home menu 62 and display and/or highlight the various options of the home menu 62 until the add function 70 is displayed and/or highlighted. The add function 70 is selected in any suitable manner. Suitable selection manners include, but not limited to: engaging the select key 28; engaging both the down and up keys 24 and 26 at essentially the same time; waiting a predetermined time; and the like. In response to selection of the add function 70, the display 22 is re-configured to display the various options of the add menu 64. Following the selection of the add function 70 at step 152, the add menu 64 is navigated to search for the rotor type associated with the rotor 36 at step 154.

At step 154 it is determined whether the rotor type associated with the rotor 36 is contained within the add menu 64. In various embodiments of the invention the rotor 36 is contained directly within the add menu 64 and/or accessed through sub-menus via selectable options within the add menu 64. An embodiment in which the rotor 36 is accessed through sub-menus via selectable options within the add menu 64 is illustrated in FIG. 5. In this embodiment, the down and/or up keys 24 and 26 are engaged to scroll through the add menu 64 and display and/or highlight the various type options of the add menu 64 until the rotor type associated with the rotor 36 is displayed and/or highlighted. If it is determined that the rotor type associated with the rotor 36 is contained within the add menu 64, then the rotor type associated with the rotor 36 is selected at step 158. If it is determined that the rotor type associated with the rotor 36 is not contained within the add menu 64, then, at step 156, it may be determined that an error has occurred.

At step 156 it is determined that an error has apparently occurred. In general, the error pertains to an inability to find the rotor type associated with the rotor 36 within the menu 60. Potential causes for this error include: use or attempted use of an inappropriate rotor; oversight by the user of the rotor type associated with the rotor 36; outdated menu 60 which does not include the rotor type associated with the rotor 36; and the like. If it is confirmed that the rotor 36 is appropriate for the centrifuge 34 and that the rotor type is not contained within the menu 60, the menu 60 may updated to include the rotor type. This update may be performed by the user, service personnel, or the like. For example, the service personnel establishes a data link with the processor 50 and/or the memory 58 within the centrifuge 34 and data associated with the rotor 36 is written to the processor 50 and/or memory 58. In various other embodiments, data may be entered by the user or service personnel, or the memory 58 may be replaced by, for example, replacing a memory chip in the centrifuge 34.

At step 158 the menu 60 is navigated to access the type menu 108-114 associated with the rotor 36. For example, the down and/or up keys 24 and 26 are engaged to scroll through the add menu 64 and display and/or highlight the various options of the add menu 64 until the type menu 108-114 associated with the rotor 36 is displayed and/or highlighted. This type menu is selected in any suitable manner. Suitable selection manners include, but not limited to: engaging the select key 28; engaging both the down and up keys 24 and 26 at essentially the same time; waiting a predetermined time; and the like. In response to selection of the type menu 108-114, the display 22 is re-configured to display the various options of the selected type menu 108-114. Following the selection of the type menu 108-114 at step 158, the selected type menu 108-114 is navigated to search for the rotor 36 at step 160.

At step 160 it is determined whether the rotor 36 is contained within the selected type menu 108-114. For example, the down and/or up keys 24 and 26 are engaged to scroll through the selected type menu 108-114 and display and/or highlight the various options of the selected type menu 108-114 until the rotor 36 is displayed and/or highlighted. If it is determined that the rotor 36 is contained within the selected type menu 108-114, then the rotor 36 is selected at step 162. If it is determined that the rotor 36 is not contained within the selected menu 108-114, then, at step 156, it may be determined that an error has occurred. In general, the error pertains to an inability to find the rotor 36 within the menu 60. Potential causes for this error include: use or attempted use of an inappropriate rotor; oversight by the user of the rotor 36; outdated menu 60 which does not include the rotor 36; and the like. If it is confirmed that the rotor 36 is appropriate for the centrifuge 34 and that the rotor 36 is not contained within the menu 60, the menu 60 may updated to include the rotor 36. As described hereinabove, this update may be performed by the user, service personnel, or the like. Additionally or in another embodiment of the invention, a back function 116-122 may be utilized to return to the add menu 64 and thereby select another type menu of the type menus 108-114.

At step 162, the rotor 36 is selected. The rotor 36 is selected in any suitable manner. Suitable selection manners include, but not limited to: engaging the select key 28; engaging both the down and up keys 24 and 26 at essentially the same time; waiting a predetermined time; initiating the centrifuge run while the rotor 36 is displayed and/or highlighted; and the like. In response to selection of the rotor 36, the rotor parameter of the centrifuge run is updated accordingly. In addition, if the rotor 36 is not already contained within the home menu 62 then, the rotor 36 is added to the home menu 62. Following the selection of the rotor 36 at step 162, any undefined run parameters may be entered prior to initiation of the centrifuge run at step 164.

At step 164 the centrifuge run is initiated by engaging the start key 30. In response to initiation of the centrifuge run, the centrifuge 34 performs the run according to the run parameters.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus including a user interface to select a desired rotor from a set of rotors corresponding to compatible rotors for use during a centrifuge run in a centrifuge device, the user interface comprising:

a home menu to access a previously selected rotor, the previously selected rotor having a rotor parameter associated therewith; and an add menu to add the desired rotor in response to the desired rotor being absent from the home menu, wherein the add menu lists for selection by a user all of the rotors in the set of rotors compatible for use in the centrifuge device;

the desired rotor having a rotor parameter associated therewith that is utilized during the centrifuge run when the desired rotor is selected.

2. The user interface according to claim 1, further comprising:

a display to present the home menu and the add menu, the home menu including a plurality of home options, the home options including the previously selected rotor and an add function, wherein the add menu and home menu including the rotors being stored in memory and displayed according to the previous selection state of the rotors.

3. The user interface according to claim 2, further comprising:

a key to navigate the home menu and the add menu, the key being configured to generate a signal in response to being engaged, wherein the add menu includes a first subset of compatible rotors and second subset of compatible rotors, where an entry of a compatible rotor is moved from the second subset to the first subset according to the selection of the desired rotor.

4. The user interface according to claim 3, further comprising:

a memory to store a run parameter; and a processor to control the display and receive signals from the key, the processor being configured to:

control the display to initially present the home menu;

store the rotor parameter of the previously selected rotor to the run parameter in response to a selection event while the previously selected rotor is being displayed;

control the display to present the add menu in response to the add function being selected; and move a newly selected rotor of the set of rotors to the home menu from the add menu, the newly selected rotor having a rotor parameter associated therewith, and store the rotor parameter associated with the newly selected rotor to the run parameter in response to the selection event while the newly selected rotor is being displayed.

5. The user interface according to claim 4, wherein the processor is further configured to control the display to scroll through the plurality of home options while the display is presenting the home menu and in response to the signal.

6. The user interface according to claim 4, wherein the processor is further configured to control the display to scroll through a plurality of type options while the display is presenting the add menu and in response to the signal.

7. The user interface according to claim 4, wherein the key is a down key and the processor is configured to control the display to scroll in a forward manner through the home menu or add menu in response to the signal.

8. The user interface according to claim 4, wherein the key is an up key and the processor is configured to control the display to scroll in a reverse manner through the home menu or add menu in response to the signal.

9. The user interface according to claim 4, wherein the processor is further configured to determine the selection event has occurred.

10. The user interface according to claim 9, further comprising a select key configured to generate a select signal in response to being engaged, wherein the processor is configured to determine the selection event has occurred in response to the select signal.

11. The user interface according to claim 9, wherein the processor is configured to determine the selection event has occurred in response to a predetermined amount of time has elapsed since last receiving the signal.

12. The user interface according to claim 9, wherein the processor is configured to determine the selection event has occurred in response to receiving a start run signal.

13. The user interface according to claim 9, wherein the key includes a down key and an up key and the processor is configured to determine the selection event has occurred in response to receiving the signal from the down key and the up key at essentially the same time.

14. The user interface according to claim 9, wherein the add menu further comprises a plurality of type menus to subdivide the set of rotors into a plurality of respective type options and the processor is configured to control the display to present the plurality of type menus.

15. An apparatus to select a desired rotor from a set of rotors compatible for use during a centrifuge run in a centrifuge device, the apparatus comprising:

a display to present a home menu and an add menu, the home menu including a plurality of home menu options, the home menu options including a previously selected rotor having a rotor parameter associated therewith and an add function, the add menu including a plurality of add menu options, the plurality of add menu options including a list of all of the rotors in the set of rotors compatible for use in the centrifuge device;

a key to navigate the home menu and the add menu, the key being configured to generate a signal in response to being engaged;

a memory to store a run parameter; and a processor to control the display and receive the signal from the key, the processor being configured to:

control the display to initially present the home menu;

store the rotor parameter associated with the previously selected rotor to the run parameter in response to a selection event while the previously selected rotor is being displayed;

control the display to present the add menu in response to the add function being selected; and move a newly selected rotor of the set of rotors to the home menu from the add menu, the newly selected rotor having a rotor parameter associated therewith, and store the rotor parameter associated with the newly selected rotor to the run parameter in response to the selection event while the newly selected rotor is being displayed.

16. The apparatus according to claim 15, wherein the processor is further configured to control the display to scroll through the plurality of home menu options while the display is presenting the home menu and in response to the signal.

17. The apparatus according to claim 15, wherein the processor is further configured to control the display to scroll through the plurality of add menu options while the display is presenting the add menu and in response to the signal.

18. The apparatus according to claim 15, wherein the key is a down key and the processor is configured to control the display to scroll in a forward manner through the home menu or add menu in response to the signal.

19. The apparatus according to claim 15, wherein the key is an up key and the processor is configured to control the display to scroll in a reverse manner through the home menu or add menu in response to the signal.

20. The apparatus according to claim 15, wherein the processor is further configured to determine the selection event has occurred.

21. The apparatus according to claim 20, further comprising a select key configured to generate a select signal in response to being engaged, wherein the processor is configured to determine the selection event has occurred in response to the select signal.

22. The apparatus according to claim 20, wherein the processor is configured to determine the selection event has occurred in response to a predetermined amount of time has elapsed since last receiving the signal.

23. The apparatus according to claim 20, wherein the processor is configured to determine the selection event has occurred in response to receiving a start run signal.

24. The apparatus according to claim 20, wherein the key includes a down key and an up key and the processor is configured to determine the selection event has occurred in response to receiving the signal from the down key and the up key at essentially the same time.

25. An apparatus for providing a user interface to a user for the user to select a desired rotor from a set of rotors compatible for use during a centrifuge run in a centrifuge device, the apparatus comprising:

means for displaying a home menu option of a plurality of home menu options in a home menu, the home menu options including a previously selected rotor having a rotor parameter associated therewith and an add function;

means for storing the rotor parameter associated with the previously selected rotor to a run parameter in response to a selection event while the previously selected rotor is being displayed;

means for displaying an add menu option of a plurality of add menu options in an add menu in response to a selection event while the add function is being displayed, the add menu listing for selection by a user all of the rotors in the set of rotors compatible for use in the centrifuge device; and means for moving a newly selected rotor of the set of rotors to the home menu from the add menu, the newly selected rotor having a rotor parameter associated therewith, and means for storing the rotor parameter associated with the newly selected rotor to the run parameter in response to the selection event while the newly selected rotor is being displayed.

26. The apparatus according to claim 25, further comprising a means for scrolling through the plurality of home menu options while displaying the home menu in response to the selection event.

27. The apparatus according to claim 25, further comprising a means for scrolling through the plurality of add menu options while displaying the add menu in response to the selection event.

28. The apparatus according to claim 25, further comprising a means for determining the selection event has occurred.

29. A method of providing a user interface to a user for the user to select a desired rotor from a set of rotors compatible for use during a centrifuge run in a centrifuge device, the method comprising:

displaying a home menu option of a plurality of home menu options in a home menu, the home menu options including a previously selected rotor having a rotor parameter associated therewith and an add function;

storing the rotor parameter associated with the previously selected rotor to a run parameter in response to a selection event while the previously selected rotor is being displayed;

displaying an add menu option of a plurality of add menu options in an add menu in response to a selection event while the add function is being displayed, the add menu listing for selection by a user all of the rotors in the set of rotors compatible for use in the centrifuge device; and moving a newly selected rotor of the set of rotors to the home menu from the add menu, the newly selected rotor having a rotor parameter associated therewith, and storing the rotor parameter associated with the newly selected rotor to the run parameter in response to the selection event while the newly selected rotor is being displayed.

30. The method according to claim 29, further comprising scrolling through the plurality of home menu options while displaying the home menu in response to the selection event, wherein the add menu includes a first subset of compatible rotors and second subset of compatible rotors, where an entry of a compatible rotor is moved from the second subset to the first subset according to the selection of the desired rotor.

31. The method according to claim 29, further comprising scrolling through the plurality of add menu options while displaying the add menu in response to the selection event.

32. The method according to claim 29, further comprising determining the selection event has occurred.

33. The method according to claim 32, wherein the selection event is determined to have occurred in response to a select signal.

34. The method according to claim 32, wherein the selection event is determined to have occurred in response to a predetermined amount of time having elapsed since last receiving a signal.

35. The method according to claim 32, wherein the selection event is determined to have occurred in response to receiving a start run signal.

36. The method according to claim 32, wherein the selection event is determined to have occurred in response to receiving a signal from a down key and an up key at essentially the same time, and the selection event is determined to have occurred in response to a passively selected option by engaging a start and stop key.

* * * * *

UNITED STATES PATENT AND TRADEMARK OFFICE

CERTIFICATE OF CORRECTION

PATENT NO. : 7,787,971 B2
APPLICATION NO. : 10/724623
DATED : August 31, 2010
INVENTOR(S) : Richard A. Hall It is certified that error appears in the above-identified patent and that said Letters Patent is hereby corrected as shown below:

Column 1, Lines 48-49, reads "an apparatus and method is provided...that...improves the process" and should read -- an apparatus and method are provided...that...improve the process --.

Column 1, Line 66, reads "This plurality of add menu option includes" and should read -- This plurality of add menu options includes --.

Column 2, Line 19, reads "This home menu options includes" and should read -- This home menu option includes --.

Column 2, Lines 41-42, reads "to include a remainder of option...minus the first subset of option" and should read -- to include a remainder of options...minus the first subset of options --.

Column 3, Lines 4-5, reads "a remainder of option...minus the first subset of option" and should read -- a remainder of options...minus the first subset of options --.

Column 6, Line 3, reads "and/or; rotors purchased" and should read -- and/or rotors purchased --.

Column 6, Lines 49-50, reads "Each of the...facilitate access to" and should read -- Each of the...facilitates access to --.

Column 9, Line 53, reads "menu 60 may updated to include" and should read -- menu 60 may be updated to include --.

Column 10, Line 28, reads "menu 60 may updated to include" and should read -- menu 60 may be updated to include --.

Signed and Sealed this
Eighteenth Day of January, 2011

David J. Kappos

David J. Kappos
*Director of the United States Patent and Trademark Office*

Column 12, Claim 11, reads “the processor is configured to determine the selection event has occured in response to a predetermined amount of time has elapsed since last receiving the signal” and should read -- the processor is configured to determine that the selection event has occured in response to a predetermined amount of time having elapsed since last receiving the signal --.

Column 13, Claim 22, reads “the processor is configured to determine the selection event has occured in response to a predetermined amount of time has elapsed since last receiving the signal” and should read -- the processor is configured to determine that the selection event has occured in response to a predetermined amount of time having elapsed since last receiving the signal --.

UNITED STATES PATENT AND TRADEMARK OFFICE

CERTIFICATE OF CORRECTION

PATENT NO. : 7,787,971 B2
APPLICATION NO. : 10/724623
DATED : August 31, 2010
INVENTOR(S) : Richard A. Hall It is certified that error appears in the above-identified patent and that said Letters Patent is hereby corrected as shown below:

Column 1, Lines 48-49, reads "an apparatus and method is provided...that...improves the process" and should read -- an apparatus and method are provided...that...improve the process --.

Column 1, Line 66, reads "This plurality of add menu option includes" and should read -- This plurality of add menu options includes --.

Column 2, Line 19, reads "This home menu options includes" and should read -- This home menu option includes --.

Column 2, Lines 41-42, reads "to include a remainder of option...minus the first subset of option" and should read -- to include a remainder of options...minus the first subset of options --.

Column 3, Lines 4-5, reads "a remainder of option...minus the first subset of option" and should read -- a remainder of options...minus the first subset of options --.

Column 6, Line 3, reads "and/or; rotors purchased" and should read -- and/or rotors purchased --.

Column 6, Lines 49-50, reads "Each of the...facilitate access to" and should read -- Each of the...facilitates access to --.

Column 9, Line 53, reads "menu 60 may updated to include" and should read -- menu 60 may be updated to include --.

Column 10, Line 28, reads "menu 60 may updated to include" and should read -- menu 60 may be updated to include --.

This certificate supersedes the Certificate of Correction issued January 18, 2011.

Signed and Sealed this
Fifteenth Day of February, 2011

David J. Kappos

David J. Kappos
*Director of the United States Patent and Trademark Office*

Column 12, Lines 4-7, Claim 11, reads “the processor is configured to determine the selection event has occurred in response to a predetermined amount of time has elapsed since last receiving the signal” and should read -- the processor is configured to determine that the selection event has occurred in response to a predetermined amount of time having elapsed since last receiving the signal --.

Column 13, Lines 11-14, Claim 22, reads “the processor is configured to determine the selection event has occurred in response to a predetermined amount of time has elapsed since last receiving the signal” and should read -- the processor is configured to determine that the selection event has occurred in response to a predetermined amount of time having elapsed since last receiving the signal --.